US012464466B2

(12) United States Patent
Huang et al.

(10) Patent No.: US 12,464,466 B2
(45) Date of Patent: Nov. 4, 2025

(54) BEAM INDICATION FOR MULTICAST WAKEUP SIGNALS

(71) Applicant: QUALCOMM Incorporated, San Diego, CA (US)

(72) Inventors: Min Huang, Beijing (CN); Chao Wei, Beijing (CN); Jing Dai, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 497 days.

(21) Appl. No.: 18/004,366

(22) PCT Filed: Aug. 28, 2020

(86) PCT No.: PCT/CN2020/112111
§ 371 (c)(1),
(2) Date: Jan. 5, 2023

(87) PCT Pub. No.: WO2022/041121
PCT Pub. Date: Mar. 3, 2022

(65) Prior Publication Data
US 2023/0284148 A1 Sep. 7, 2023

(51) Int. Cl.
H04W 52/02 (2009.01)
H04B 7/06 (2006.01)
H04B 7/08 (2006.01)

(52) U.S. Cl.
CPC .... H04W 52/0274 (2013.01); H04B 7/06952 (2023.05); H04B 7/088 (2013.01); H04W 52/0232 (2013.01)

(58) Field of Classification Search
CPC ......... H04W 52/0274; H04W 52/0232; H04W 76/28; H04W 76/40; H04W 52/0235;
(Continued)

(56) References Cited

U.S. PATENT DOCUMENTS

2016/0374107 A1 12/2016 Das et al.
2017/0331670 A1 11/2017 Parkvall et al.
(Continued)

FOREIGN PATENT DOCUMENTS

CN 107347020 A 11/2017
CN 109417414 A 3/2019
(Continued)

OTHER PUBLICATIONS

International Search Report and Written Opinion—PCT/CN2020/112111—ISA/EPO—May 26, 2021.
(Continued)

Primary Examiner — Afshawn M Towfighi
(74) Attorney, Agent, or Firm — Guang Y. Zhang; Harrity & Harrity, LLP

(57) ABSTRACT

Various aspects of the present disclosure generally relate to wireless communication. In some aspects, a user equipment (UE) may transmit, to a base station, a first message that indicates a preferred beam and a multicast session. The UE may receive, from the base station, a second message that indicates an association between a wakeup signal (WUS) and the multicast session, and a set of beams for receiving the WUS, the set of beams including the preferred beam. The UE may receive, from the base station and based at least in part on the second message, the WUS for the multicast session using a beam from the set of beams. Numerous other aspects are provided.

30 Claims, 11 Drawing Sheets

(58) Field of Classification Search
CPC ......... H04W 4/06; H04B 7/088; H04B 7/063;
H04B 7/0695; H04L 5/0057; H04L
5/0023; H04L 5/0053; H04L 12/189;
Y02D 30/70
See application file for complete search history.

(56) References Cited

U.S. PATENT DOCUMENTS

| | | | |
|---|---|---|---|
| 2018/0219600 A1* | 8/2018 | Kim | .................. H04B 7/0626 |
| 2019/0392647 A1 | 12/2019 | Lee | |
| 2020/0008261 A1* | 1/2020 | Islam | .................. H04B 7/0617 |
| 2020/0037247 A1 | 1/2020 | Liao et al. | |
| 2021/0144516 A1* | 5/2021 | Kim | .................. H04W 72/046 |

FOREIGN PATENT DOCUMENTS

| | | | |
|---|---|---|---|
| CN | 109496454 A | | 3/2019 |
| CN | 110536230 A | | 12/2019 |
| WO | WO-2018017005 A1 | | 1/2018 |

OTHER PUBLICATIONS

Supplementary European Search Report—EP20950791—Search Authority—Munich—Mar. 27, 2024.

* cited by examiner

US 12,464,466 B2

BEAM INDICATION FOR MULTICAST WAKEUP SIGNALS

CROSS-REFERENCE TO RELATED APPLICATION

This Patent Application is a 371 national stage of PCT Application No. PCT/CN2020/112111 filed on Aug. 28, 2020, entitled "BEAM INDICATION FOR MULTICAST WAKEUP SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam indication for multicast wakeup signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, a first message that indicates a preferred beam and a multicast session; receiving, from the base station, a second message that indicates an association between a wakeup signal (WUS) and the multicast session, and a set of beams for receiving the WUS, the set of beams including the preferred beam; and receiving, from the base station and based at least in part on the second message, the WUS for the multicast session using a beam from the set of beams.

In some aspects, a method of wireless communication performed by a base station includes receiving, from a UE, a first message that indicates a preferred beam and a multicast session; transmitting, to the UE, a second message that indicates an association between a WUS and the multicast session, and a set of beams for receiving the WUS, the set of beams including the preferred beam; and transmitting, based at least in part on the second message, the WUS for the multicast session using the set of beams.

In some aspects, a UE for wireless communication includes a memory and one or more processors operatively coupled to the memory, the memory and the one or more processors configured to: transmit, to a base station, a first message that indicates a preferred beam and a multicast session; receive, from the base station, a second message that indicates an association between a WUS and the multicast session, and a set of beams for receiving the WUS, the set of beams including the preferred beam; and receive, from the base station and based at least in part on the second message, the WUS for the multicast session using a beam from the set of beams.

In some aspects, a base station for wireless communication includes a memory and one or more processors operatively coupled to the memory, the memory and the one or more processors configured to: receive, from a UE, a first message that indicates a preferred beam and a multicast session; transmit, to the UE, a second message that indicates an association between a WUS and the multicast session, and a set of beams for receiving the WUS, the set of beams including the preferred beam; and transmit, based at least in part on the second message, the WUS for the multicast session using the set of beams.

In some aspects, a non-transitory computer-readable medium storing a set of instructions for wireless communication includes one or more instructions that, when executed by one or more processors of a UE, cause the UE to: transmit, to a base station, a first message that indicates a preferred beam and a multicast session; receive, from the base station, a second message that indicates an association between a WUS and the multicast session, and a set of beams for receiving the WUS, the set of beams including the preferred beam; and receive, from the base station and based at least in part on the second message, the WUS for the multicast session using a beam from the set of beams.

In some aspects, a non-transitory computer-readable medium storing a set of instructions for wireless communication includes one or more instructions that, when executed by one or more processors of a base station, cause the base station to: receive, from a UE, a first message that indicates a preferred beam and a multicast session; transmit, to the UE, a second message that indicates an association between a WUS and the multicast session, and a set of beams for receiving the WUS, the set of beams including the preferred beam; and transmit, based at least in part on the second message, the WUS for the multicast session using the set of beams.

In some aspects, an apparatus for wireless communication includes means for transmitting, to a base station, a first message that indicates a preferred beam and a multicast session; means for receiving, from the base station, a second message that indicates an association between a WUS and the multicast session, and a set of beams for receiving the WUS, the set of beams including the preferred beam; and means for receiving, from the base station and based at least in part on the second message, the WUS for the multicast session using a beam from the set of beams.

In some aspects, an apparatus for wireless communication includes means for receiving, from a UE, a first message that indicates a preferred beam and a multicast session; means for transmitting, to the UE, a second message that indicates an association between a WUS and the multicast session, and a set of beams for receiving the WUS, the set of beams including the preferred beam; and means for transmitting, based at least in part on the second message, the WUS for the multicast session using the set of beams.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
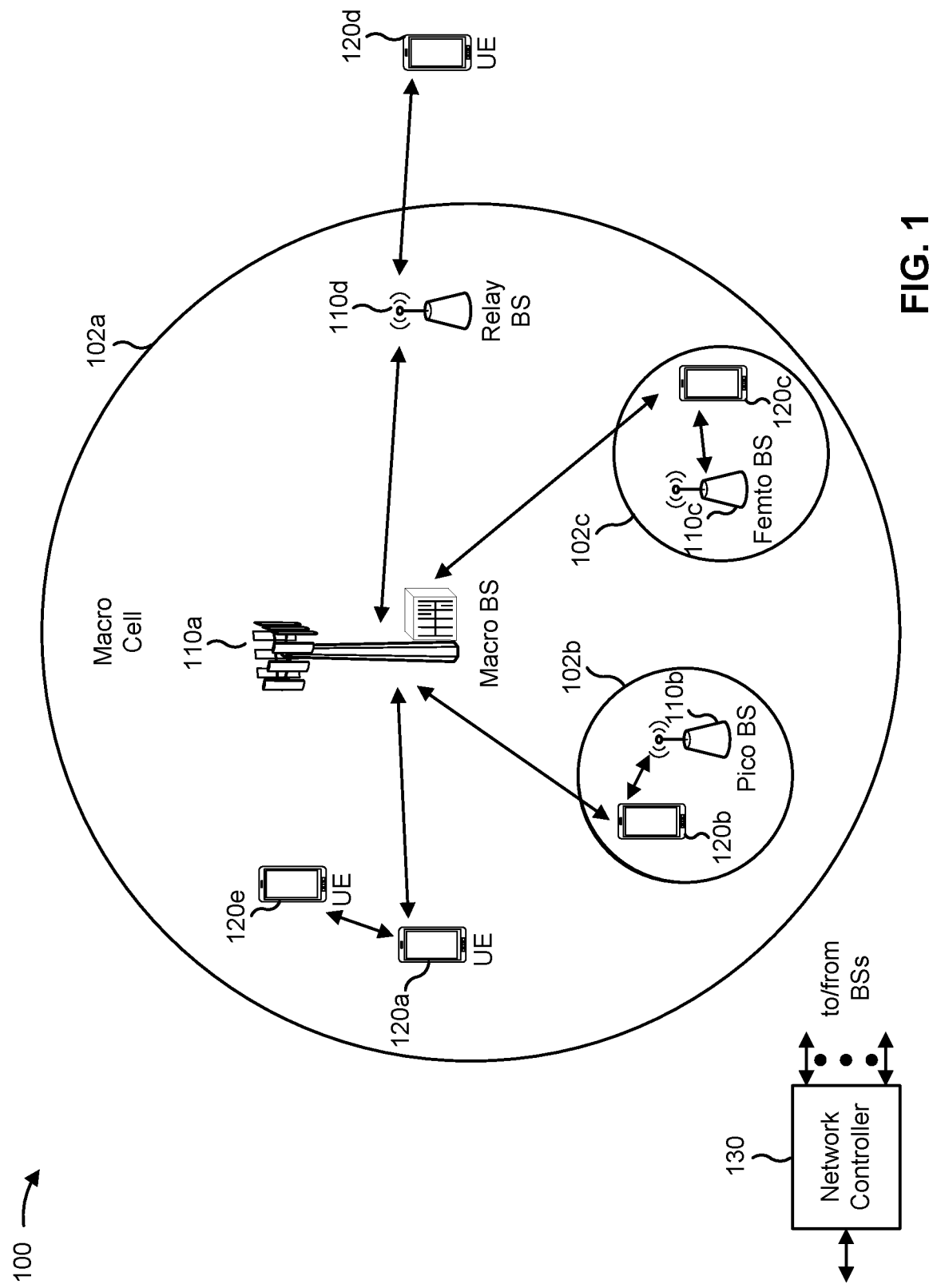
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
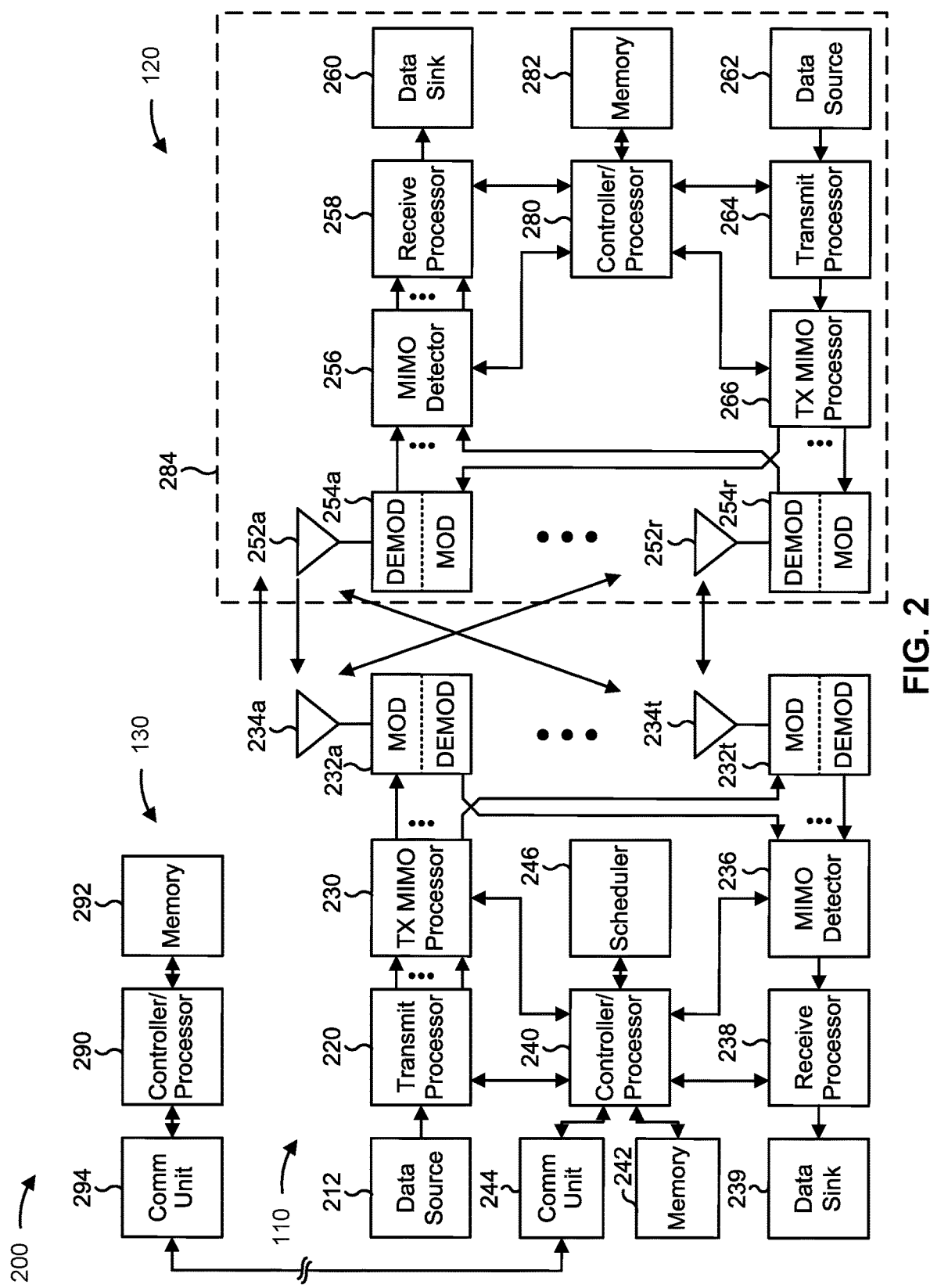
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-8.

Controller/processor 240 of base station 110, controller/processor 280 of UE 120, and/or any other component(s) of FIG. 2 may perform one or more techniques associated with beam indication for multicast wakeup signals, as described in more detail elsewhere herein. For example, controller/ processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, UE 120 may include means for transmitting, to a base station, a first message that indicates a preferred beam and a multicast session, means for receiving, from the base station, a second message that indicates an association between a WUS and the multicast session, and a set of beams for receiving the WUS, the set of beams including the preferred beam, means for receiving, from the base station and based at least in part on the second message, the WUS for the multicast session using a beam from the set of beams, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a first message that indicates a preferred beam and a multicast session, means for transmitting, to the UE, a second message that indicates an association between a WUS and the multicast session, and a set of beams for receiving the WUS, the set of beams including the preferred beam, means for transmitting, based at least in part on the second message, the WUS for the multicast session using the set of beams, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
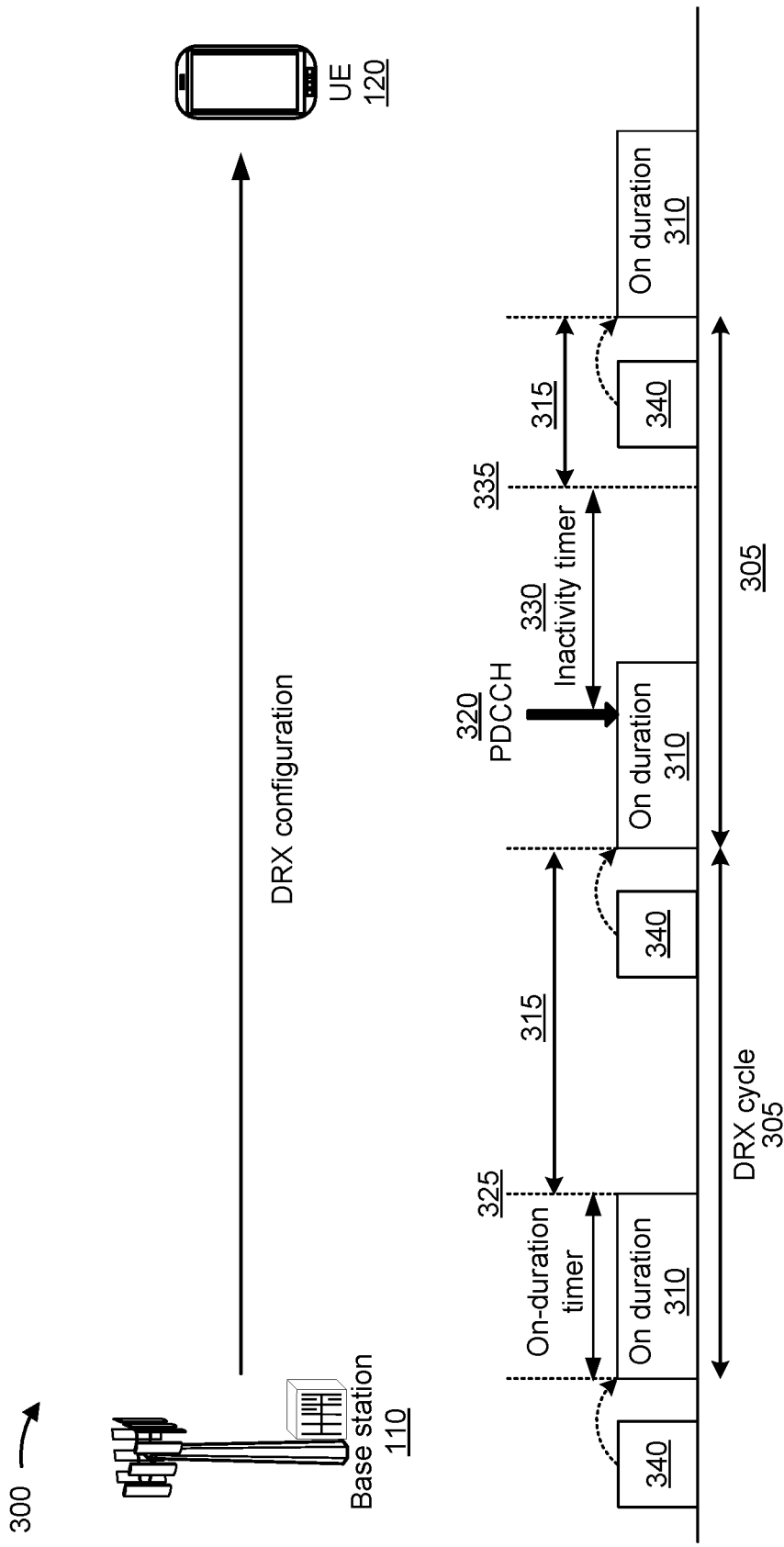
FIG. 3 is a diagram illustrating an example of a discontinuous reception (DRX) configuration, in accordance with various aspects of the present disclosure.

FIG. 3 is a diagram illustrating an example 300 of a DRX configuration, in accordance with various aspects of the present disclosure.

As shown in FIG. 3, a base station 110 may transmit a DRX configuration to a UE 120 to configure a DRX cycle 305 for the UE 120. In some cases, the DRX configuration may be for a connected mode of the UE 120 (which may be referred to as connected mode DRX (C-DRX)). A DRX cycle 305 may include a DRX on-duration 310 (e.g., during which a UE 120 is awake or in an active state) and an opportunity to enter a DRX sleep state 315. As used herein, a time during which the UE 120 is configured to be in an active state during the DRX on-duration 310 may be referred to as an active time, and a time during which the UE 120 is configured to be in the DRX sleep state 315 may be referred to as an inactive time. As described below, the UE 120 may monitor a physical downlink control channel (PDCCH) during the active time and may refrain from monitoring the PDCCH during the inactive time.

During the DRX on-duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on-duration 310, then the UE 120 may enter the sleep state 315 (e.g., for the inactive time) at the end of the DRX on-duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot, a subframe, and/or the like). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

In some cases, further power conservation for DRX may be achieved using a wakeup signal (which may also be referred to as a power saving signal). The UE 120 may monitor for a wakeup signal (WUS) in WUS monitoring occasions 340. Accordingly, a WUS may be configured to be received in a PDCCH before a DRX active time. The WUS may indicate whether the UE is to monitor for a PDCCH during an active time of a DRX cycle. For example, the WUS may indicate whether the UE 120 is to skip monitoring in the next DRX active time (e.g., following the WUS). Accordingly, the UE may not perform a wakeup operation for the active time when a wakeup signal is not detected (e.g., the UE may only wake up when a wakeup signal is detected).

A WUS may be PDCCH-based and may use DCI format 2_6 with a cyclic redundancy check (CRC) scrambled by a power saving radio network temporary identifier (PS-RNTI). A WUS may be shared by a group of UEs, and therefore the group of UEs may monitor for the WUS in common search space sets. The WUS may indicate individual wakeup information for each UE of the group of UEs (e.g., based at least in part on a downlink buffer associated with the UE). In addition, a WUS may indicate the dormancy behavior for one or more (e.g., up to five) secondary cell (SCell) groups. A first field of the DCI may indicate WUS information for a first UE, a second field of the DCI may indicate WUS information for a second UE, and so forth.

As indicated above, FIG. 3 is provided as an example. Other examples may differ from what is described with respect to FIG. 3.

Figure 4:
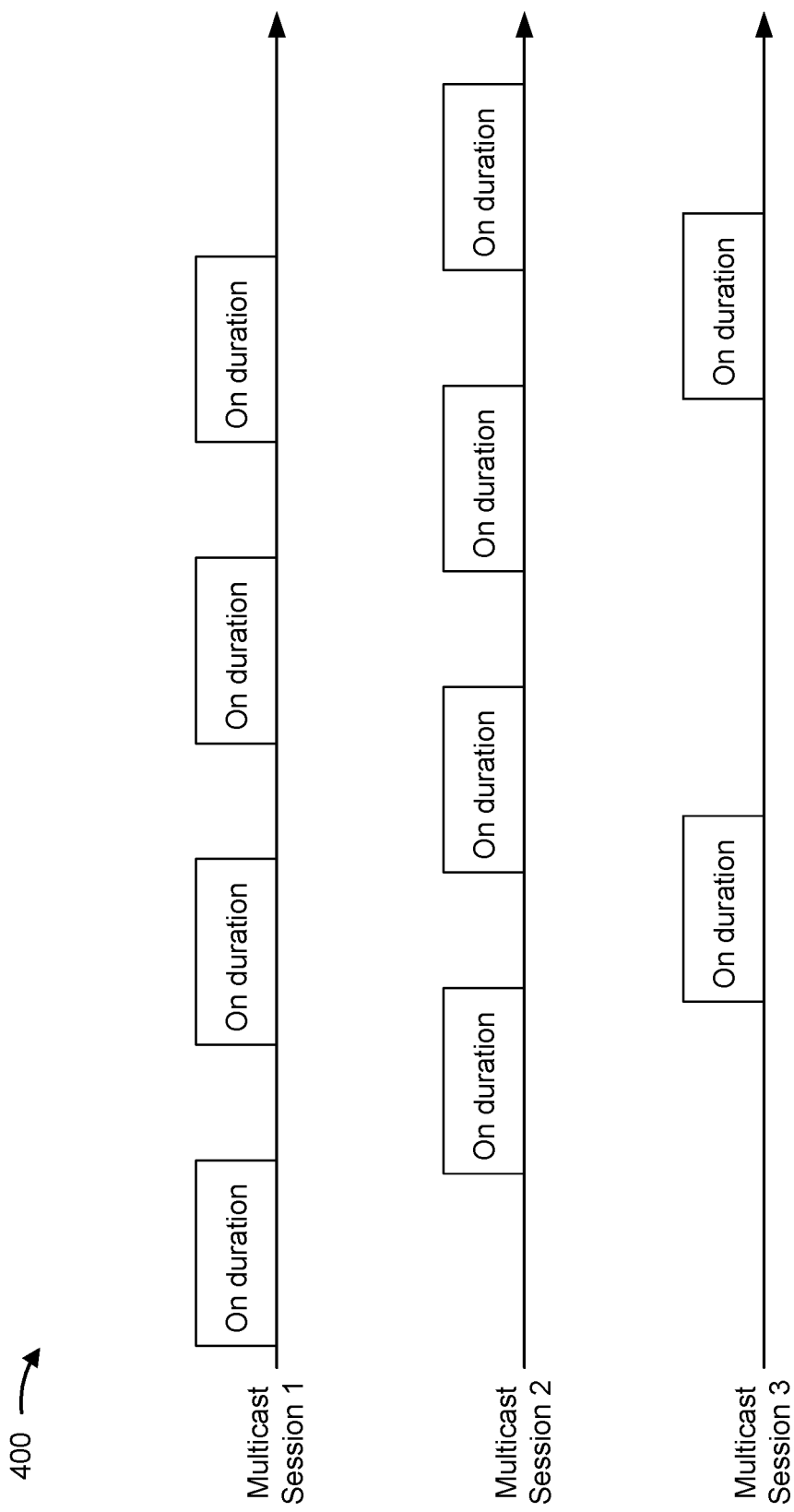
FIG. 4 is a diagram illustrating an example of DRX configurations for multicast sessions, in accordance with various aspects of the present disclosure.

FIG. 4 is a diagram illustrating an example 400 of DRX configurations for multicast sessions, in accordance with various aspects of the present disclosure.

A UE may be configured to receive one or more multimedia broadcast multicast service (MBMS) sessions. References herein to "MBMS," "multicast," "broadcast," and/or the like, may refer to any of the foregoing.

When DRX is configured for single cell point-to-multipoint (SC-PTM), a UE may discontinuously monitor for a PDCCH scheduling an SC-multicast control channel (MCCH) and/or a PDCCH scheduling an SC-multicast traffic channel (MTCH) using a DRX operation. In this case, a DRX operation may be performed independently for each group-RNTI (G-RNTI) and SC-RNTI used for SC-PTM. For example, a base station may transmit SC-MCCH signaling with DCI scrambled with an SC-RNTI to all UEs in a cell. The DCI of the SC-MCCH may configure one or more multicast sessions, and each multicast session may be associated with a separate G-RNTI and DRX profile (e.g., separate DRX cycle length, DRX on-duration length, DRX inactivity timer length, DRX scheduling offset, and/or the like). For example, as shown in FIG. 4, multicast sessions 1 and 2 may be configured with the same DRX cycle length but different scheduling offsets, and multicast session 3 may be configured with a different DRX cycle length from multicasts sessions 1 and 2.

A UE that is configured to receive multiple multicast sessions performs PDCCH monitoring during on-durations of the multiple multicast sessions according to respective DRX profiles for the multiple multicast sessions. For example, the UE performs PDCCH blind decoding for DCI scrambled by respective G-RNTIs for the multiple multicast sessions.

As indicated above, FIG. 4 is provided as an example. Other examples may differ from what is described with respect to FIG. 4.

Some UEs may be associated with a reduced capability relative to a baseline UE (e.g., an enhanced mobile broadband (eMBB) UE and/or the like). For example, a reduced capability (RedCap) UE, such as an Internet of Things (IoT) UE, a machine-type communication (MTC) UE, an NR Light UE, and/or the like, may be associated with a reduced capability relative to an eMBB UE. A RedCap UE may be used for an industrial wireless sensor, a video surveillance device, a smart wearable device, and/or the like. A RedCap UE may have a lower communicative capacity, relative to a baseline UE (e.g., an eMBB UE and/or the like). For example, a RedCap UE may be limited in terms of maximum bandwidth (e.g., 5 MHz, 10 MHz, 20 MHz, and/or the like), maximum transmission power (e.g., 20 dBm, 14 dBm, and/or the like), quantity of receive antennas (e. g., 1 receive antenna, 2 receive antennas, and/or the like), and/or the like. A RedCap UE may also have a prolonged battery life, relative to a baseline UE (e.g., an eMBB UE and/or the like).

Due to a RedCap UE's use of fewer receive antennas, reduced processing gain, and/or the like, multicast communications to a RedCap UE may need a higher beamforming gain relative to a baseline UE. A narrower beam coverage may result from the use of the higher beamforming gain, and therefore a base station may employ beam sweeping to reach multiple, distributed RedCap UEs.

Moreover, a RedCap UE may have a lower battery capacity relative to a baseline UE, and therefore a RedCap UE may need greater power saving (e.g., to provide a prolonged battery life for the RedCap UE). Accordingly, it may be beneficial for a RedCap UE to receive multicast communications, such as a WUS for a multicast DRX configuration (referred to as a multicast WUS), using a single beam. However, because a multicast WUS is intended for multiple UEs, a base station may transmit a multicast WUS using multiple beams in a beam sweep (e.g., in all directions), as described above. This may consume significant radio resources, particularly if multiple multicast sessions are transmitted in a cell.

Some techniques and apparatuses described herein enable high beamforming gain for transmission of a multicast WUS, while reducing radio resource consumption and improving UE power savings. In some aspects, a UE may report a preferred beam and a multicast session of interest to a base station. In some aspects, the base station may determine an association between a multicast WUS and one or more multicast sessions based at least in part on reports from one or more UEs. Moreover, the base station may generate a sorted list of beams for receiving the multicast WUS based at least in part the preferred beams reported by the UEs. In some aspects, the base station may indicate (e.g., broadcast) to the UEs multicast WUS associations and beam lists for one or more multicast sessions. Accordingly, the base station may transmit a multicast WUS, for a multicast session, using the beam list indicated for the multicast session, and a UE interested in the multicast session may receive the multicast WUS on a preferred beam reported by the UE. In this way, the base station may avoid transmitting a multicast WUS in all beam directions, thereby conserving radio resources. Moreover, the UE may receive a multicast WUS on a preferred beam and with reduced PDCCH monitoring for the multicast WUS, thereby conserving power of the UE.

Figure 5:
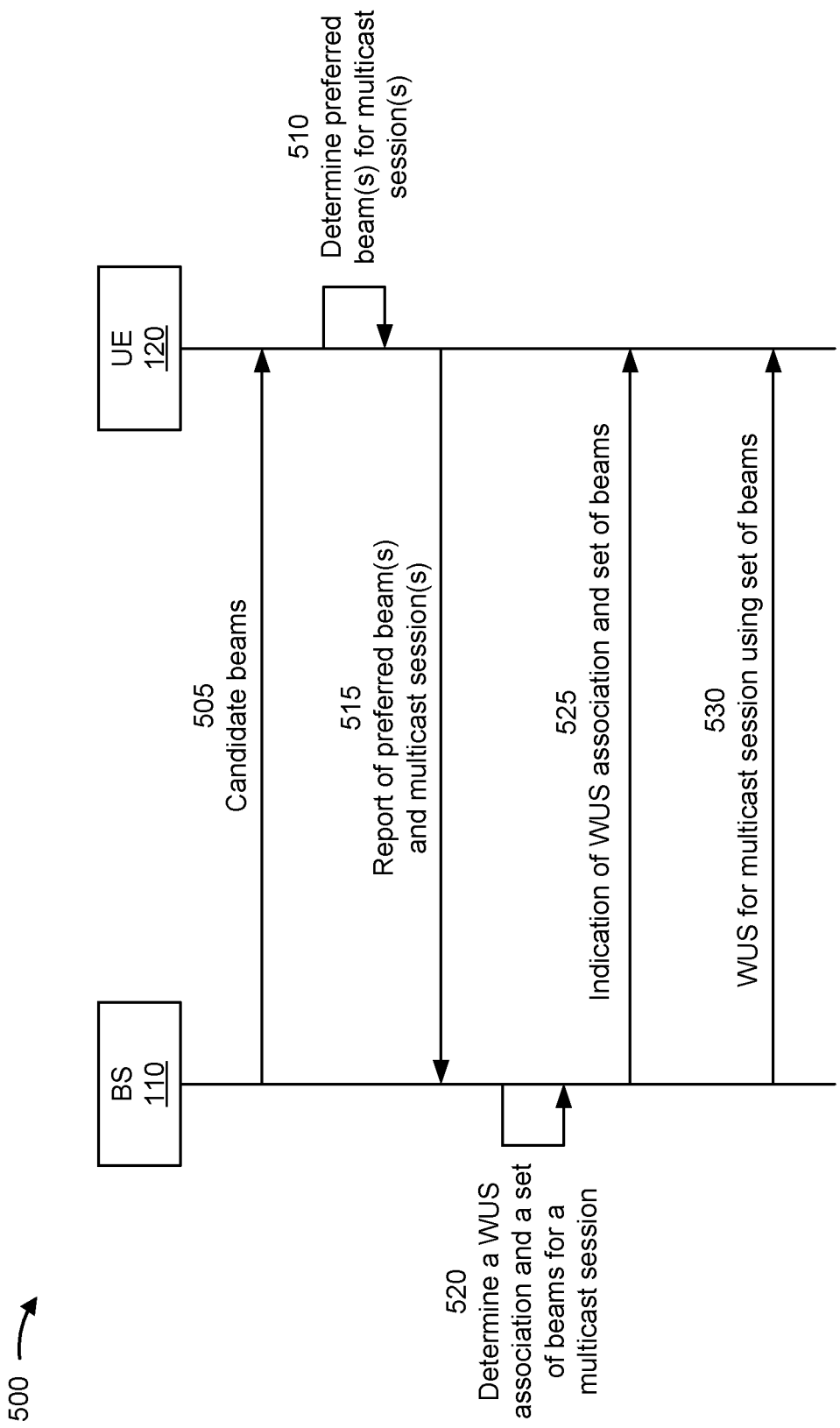
FIG. 5 is a diagram illustrating an example associated with beam indication for multicast wakeup signals, in accordance with various aspects of the present disclosure.

FIG. 5 is a diagram illustrating an example 500 associated with beam indication for multicast wakeup signals, in accordance with various aspects of the present disclosure. As shown in FIG. 5, a base station 110 and a UE 120 may communicate with one another. In some aspects, the UE 120 may be a RedCap UE, as described above.

As shown by reference number 505, the base station 110 may transmit a reference signal in a plurality of candidate beams. For example, the base station 110 may transmit the reference signal in a beam sweep (e.g., in all beam directions). The reference signal may be a synchronization signal block (SSB), a channel station information reference signal (CSI-RS), and/or the like. The UE 120 may receive the reference signal in one or more of the plurality of candidate beams.

As shown by reference number 510, the UE 120 may determine one or more preferred beams for a multicast session of interest to the UE 120. For example, the UE 120 may determine the preferred beam(s) from the plurality of candidate beams received at the UE 120. In some aspects, the UE 120 may determine one or more channel quality measurements (e.g., RSRP, RSRQ, signal to interference plus noise ratio (SINR), and/or the like) associated with the plurality of candidate beams received at the UE 120. The preferred beam(s) may be beams, of the plurality of candidate beams, associated with a highest channel quality, associated with a channel quality measurement satisfying a threshold value, and/or the like. In addition, the UE 120 may determine one or more multicast sessions of interest to the UE 120 (e.g., one or more multicast sessions to which the UE 120 is subscribed, to which the UE 120 is requesting subscription, and/or the like). The one or more preferred beams may be used by the UE 120 to receive a multicast WUS for the one or more multicast sessions of interest, as described below.

As shown by reference number 515, the UE 120 may transmit, and the base station 110 may receive, a message (e.g., a first message) that includes a report of the preferred beam(s) and the multicast session(s) of interest. In some aspects, the report may also indicate a respective channel status (e.g., a respective channel quality) associated with the preferred beam(s).

In some aspects, the preferred beam(s) may be identified by quasi-co-location (QCL) information. In addition, the report may indicate the preferred beam(s) by beam indices (e.g., SSB indices, CSI-RS indices, and/or the like, associated with the plurality of candidate beams), and may indicate the multicast session(s) of interest by multicast session indices. The UE 120 may transmit the message in radio resource control (RRC) signaling, in a medium access control control element (MAC-CE), or in uplink control information (UCI). For example, the report may be a channel state information (CSI) report for multicast. In some aspects, the UE 120 may transmit the message in a physical random access channel (PRACH) preamble message. For example, the UE 120 may transmit a PRACH preamble message in a PRACH instance associated with an SSB instance of the plurality of candidate beams. In this case, the preferred beam of the UE 120 may be indicated by the PRACH instance used to transmit the PRACH preamble message (e.g., according to the association with the SSB instance), and the report may not indicate the preferred beam.

As shown by reference number 520, the base station 110 may determine an association between a multicast WUS (e.g., a set of WUS monitoring occasions) and a multicast session, and a set of beams for receiving the WUS. In particular, the base station 110 may determine, for each multicast session reported by one or more UEs, an association with a WUS and a set of beams for receiving the WUS. The base station 110 may determine such associations and sets of beams based at least in part on reports received from one or more UEs. For example, the base station 110 may determine the set of beams for a WUS associated with a multicast session based at least in part on preferred beams reported by one or more UEs that also reported interest in the multicast session.

In some aspects, the base station 110 may generate a list of the set of beams determined for a WUS. The base station 110 may sort the list when generating the list. For example, the list may be sorted (in ascending order or descending order, or by some other scheme) by beam index, sorted by channel qualities associated with the beams, sorted by beam popularity (e.g., sorted by a quantity of times that each beam was reported by a UE), and/or the like. Moreover, the base station 110 may remove duplicates of beams (e.g., if multiple UEs reported the same beam) when generating the list.

In some aspects, the base station 110 may determine that a single WUS is to be associated with a single multicast session. For example, if a multicast session reported by a UE is configured with a different DRX cycle length (e.g., DRX period) from any other multicast session reported by a UE, then the base station 110 may determine that the multicast session is to be the only multicast session associated with a particular WUS. In this case, the set of beams for receiving the WUS may include the preferred beams reported by one or more UEs that also reported interest in the multicast session.

In some aspects, the base station 110 may determine that a single WUS is to be associated with multiple multicast sessions. For example, if multiple multicast sessions reported by one or more UEs are configured with the same DRX cycle length (e.g., DRX period), then the base station 110 may determine that the multiple multicast sessions are to be associated with the same WUS. In this case, the set of beams for receiving the WUS may include the preferred beams reported by one or more UEs that also reported interest in one or more of the multiple multicast sessions.

As shown by reference number 525, the base station 110 may transmit, and the UE 120 may receive, a message (e.g., a second message) that includes an indication of an association between a WUS and a multicast session, and a set of beams for receiving the WUS. In particular, the message may indicate, for each multicast session reported by one or more UEs, an association with a WUS and a set of beams for receiving the WUS. In some aspects, the base station 110 may transmit the message to the UE 120 via unicast (e.g., in dedicated RRC signaling, in UE-specific DCI, and/or the like). In some aspects, the base station 110 may transmit the message to one or more UEs (e.g., UE 120) in a cell of the base station 110 via broadcast (e.g., in a system information block (SIB), in group-common DCI, and/or the like).

As shown by reference number 530, the base station 110 may transmit a multicast WUS for one or more multicast sessions using the set of beams indicated for the WUS (e.g., the base station 110 may repetitively transmit the WUS using each beam of the set of beams). In particular, the base station 110 may transmit a respective WUS, for each multicast session reported by one or more UEs (and/or each group of multicast sessions configured with a same DRX cycle length), using the set of beams indicated for the WUS. For example, the base station 110 may transmit a WUS in a beam sweep of a set of beams indicated for the WUS. In this way, the base station 110 may transmit WUS(s) for one or more multicast sessions using a reduced set of beams, thereby conserving radio resources.

The UE 120 may receive a WUS for a multicast session of interest using a beam of the set of beams indicated for receiving the WUS. For example, the set of beams may include the preferred beam(s) reported by the UE 120, and the UE 120 may receive the WUS using the preferred beam(s). In some aspects, the UE 120 may use a beam of the set of beams that was not reported to be a preferred beam of the UE 120 (e.g., if the UE 120 determines that a different beam is better for receiving the WUS than the preferred beam(s) reported by the UE 120).

As described above, a WUS for a multicast session may indicate whether one or more UEs are requested to monitor a PDCCH during a next DRX on-duration of the multicast session. For example, the WUS may indicate whether the UE 120 is to monitor, or is not to monitor, the PDCCH. In some aspects, the WUS may indicate that the UE 120 is to monitor the PDCCH, and the UE 120 may enter an awake state in order to monitor the PDCCH. In some aspects, the WUS may not indicate that the UE 120 is to monitor the PDCCH, and the UE 120 may remain in a sleep state, thereby conserving battery resources of the UE 120.

As indicated above, FIG. 5 is provided as an example. Other examples may differ from what is described with respect to FIG. 5.

Figure 6A:
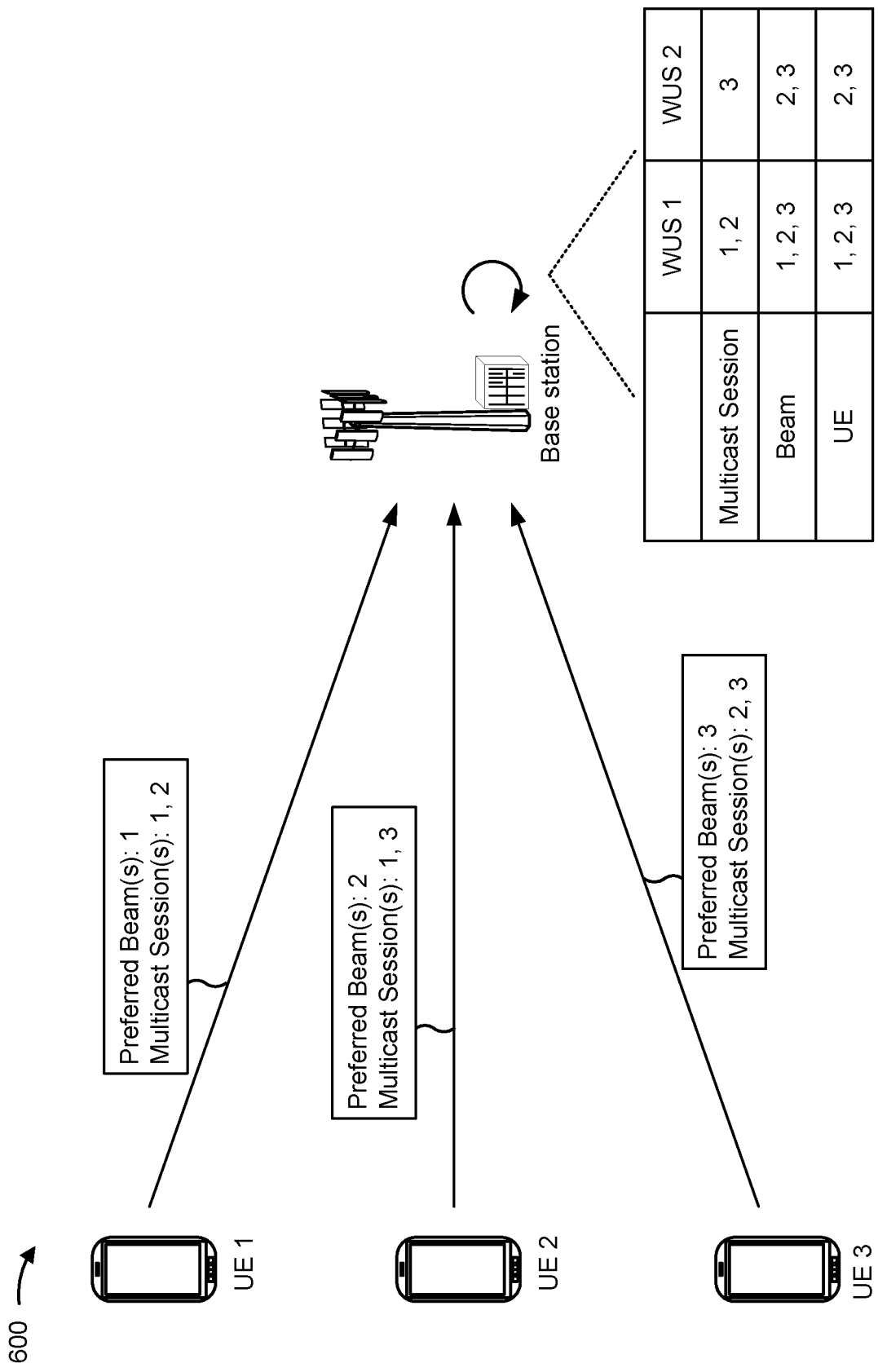
FIGS. 6A and 6B are diagrams illustrating an example associated with beam indication for multicast wakeup signals, in accordance with various aspects of the present disclosure.
Figure 6B:
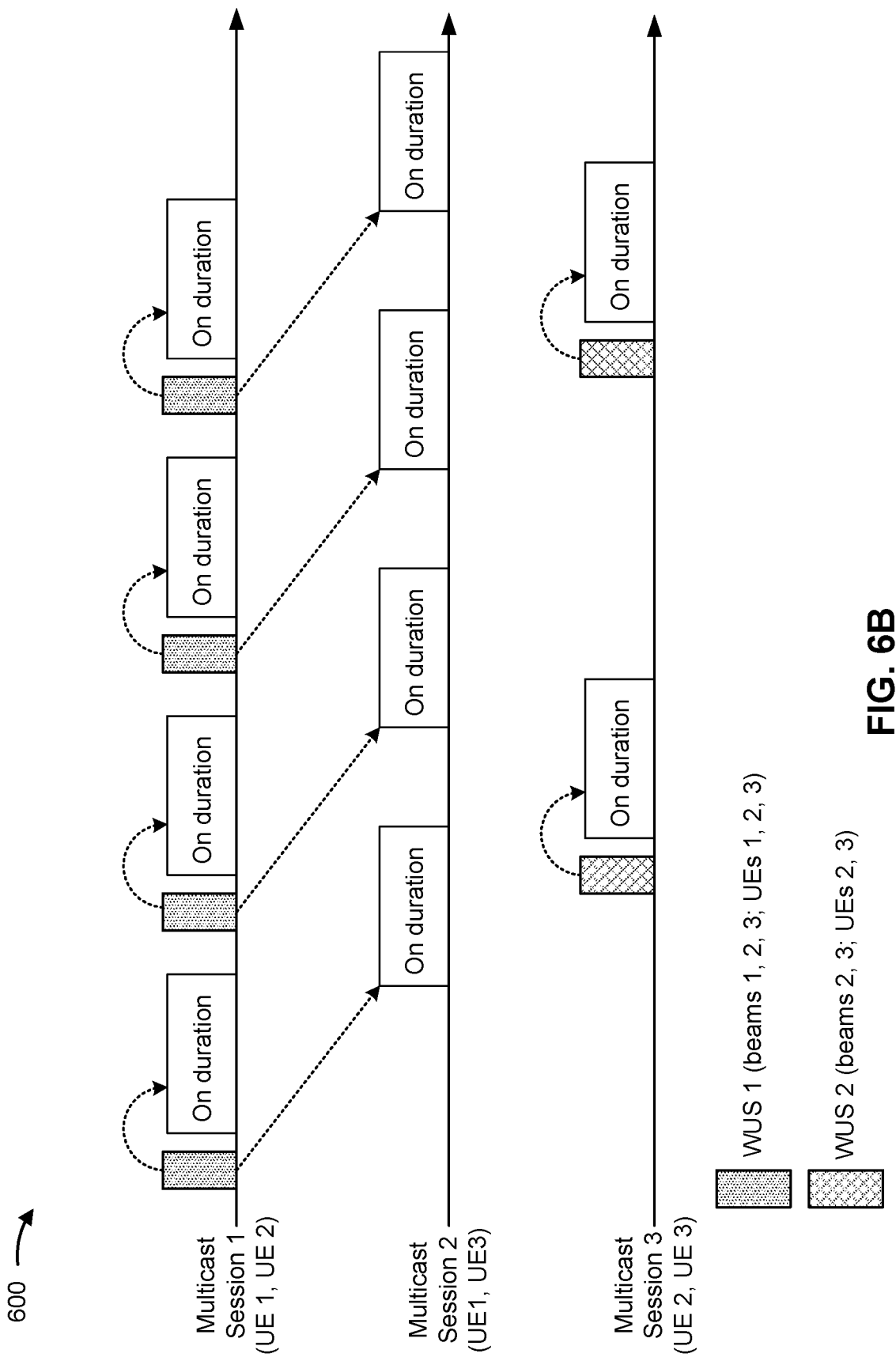

FIGS. 6A and 6B are diagrams illustrating an example 600 associated with beam indication for multicast wakeup signals, in accordance with various aspects of the present disclosure. As shown in FIGS. 6A and 6B, a base station may communicate with a plurality of UEs. In some aspects, the UEs may be RedCap UEs, as described above. In some aspects, the base station may be a base station 110, and the UEs may be UEs 120. Although FIG. 6A shows three UEs, the example 600 may include more or less than three UEs.

As shown in FIG. 6A, UE 1, UE 2, and UE 3 may transmit, to the base station, reports indicating one or more preferred beams and one or more multicast sessions of interest, as described above. For example, UE 1 may report beam 1 and multicast sessions 1 and 2; UE 2 may report beam 2 and multicast sessions 1 and 3; and UE 3 may report beam 3 and multicast sessions 2 and 3.

As further shown in FIG. 6A, the base station may determine associations between WUSs (e.g., WUS monitoring occasions) and multicast sessions, and determine respective sets of beams for the WUSs, as described above. As shown, the base station may determine that WUS 1 is associated with multicast sessions 1 and 2, based at least in part on a determination that multicast sessions 1 and 2 are configured with the same DRX cycle length (as shown in FIG. 6B). Additionally, the base station may determine that WUS 2 is associated with multicast session 3, based at least in part on a determination that multicast session 3 does not have the same DRX cycle length as multicast session 1 or 2 (as shown in FIG. 6B).

Based at least in part on the determination that WUS 1 is associated with multicast sessions 1 and 2, the base station may determine that the beams reported by the UEs that also indicated interest in one or more of multicast sessions 1 and 2 (e.g., UE 1, UE 2, and UE 3) are to be used for receiving WUS 1. Accordingly, the base station may determine that beams 1, 2, and 3 are to be used for receiving WUS 1. Based at least in part on the determination that WUS 2 is associated with multicast session 3, the base station may determine that the beams reported by the UEs that also indicated interest in multicast session 3 (e.g., UE 2 and UE 3) are to be used for receiving WUS 2. Accordingly, the base station may determine that beams 2 and 3 are to be used for receiving WUS 2. The base station may transmit information indicating the multicast WUS-multicast session associations and the sets of beams for the multicast WUSs to UE 1, UE 2, and UE 3 (e.g., as a broadcast message or as separate unicast messages), as described above.

As shown in FIG. 6B, the base station may transmit WUS 1 using beams 1, 2, and 3, and UE 1, UE 2, and UE 3 (e.g., which reported interest in at least one of multicast sessions 1 or 2, associated with WUS 1) may receive WUS 1 using at least one of beams 1, 2, or 3. For example, UE 1 may receive WUS 1 using the preferred beam reported by UE 1 (beam 1); UE 2 may receive WUS 1 using the preferred beam reported by UE 2 (beam 2); and UE 3 may receive WUS 1 using the preferred beam reported by UE 3 (beam 3). The base station may transmit WUS 2 using beams 2 and 3, and UE 2 and UE 3 (e.g., which reported interest in multicast session 3, associated with WUS 2) may receive WUS 2 using at least one of beams 2 or 3. For example, UE 2 may receive WUS 2 using the preferred beam reported by UE 2 (beam 2); and UE 3 may receive WUS 2 using the preferred beam reported by UE 3 (beam 3).

As shown in FIG. 6B, WUS 1 may indicate wakeup information for multicast sessions 1 and 2 because multicast sessions 1 and 2 share a DRX cycle length (but with different scheduling offsets). Moreover, WUS 1 may indicate separate wakeup information for UE 1, UE 2, and UE 3, which reported interest in one or more of multicast sessions 1 or 2. WUS 2 may indicate wakeup information for only multicast session 3 because multicast session 3 has a unique DRX cycle length among the multicast sessions. Moreover, WUS 2 may indicate separate wakeup information for UE 2 and UE 3, which reported interest in multicast sessions 3.

As indicated above, FIGS. 6A and 6B are provided as examples. Other examples may differ from what is described with respect to FIGS. 6A and 6B.

Figure 7:
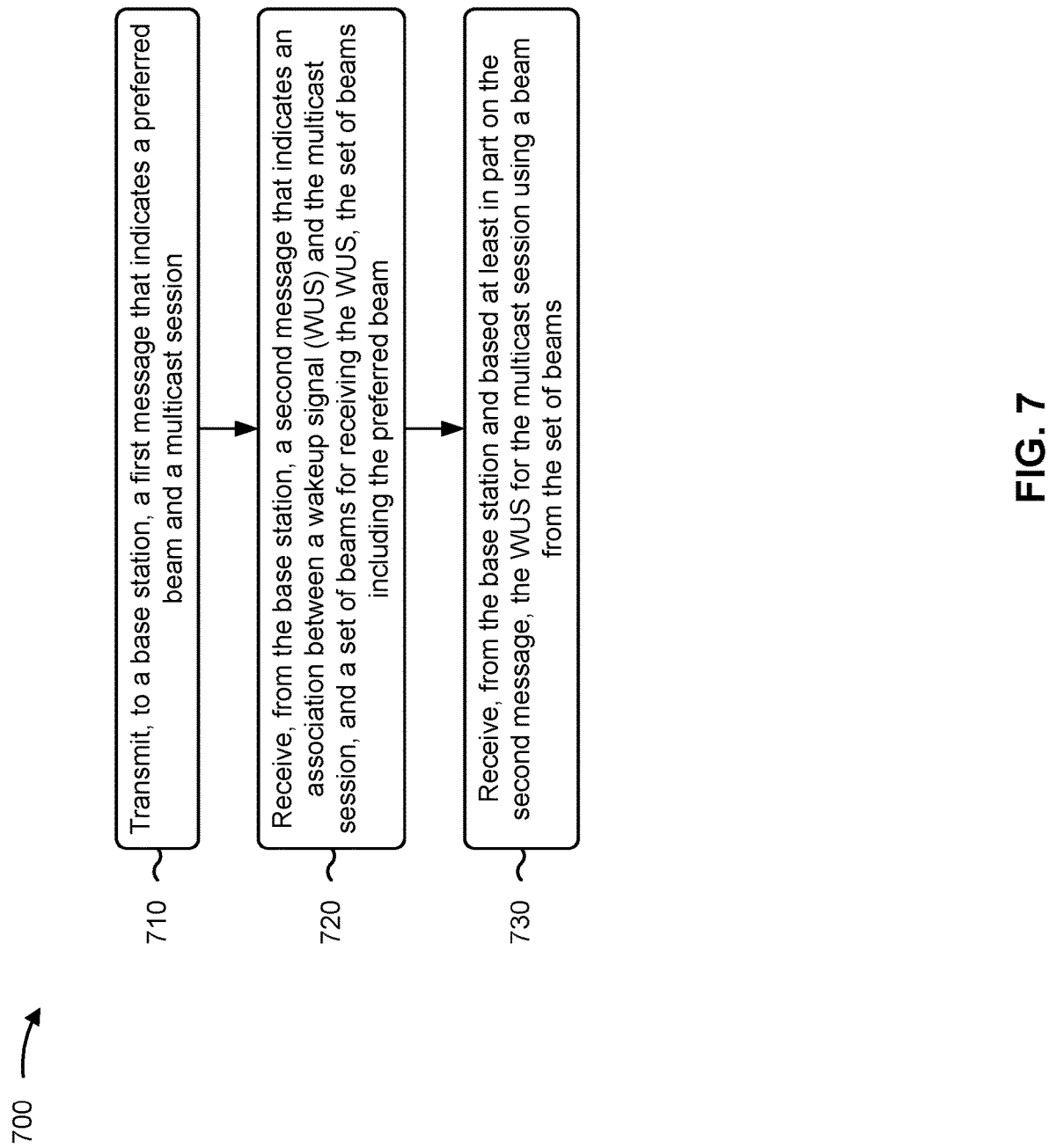
FIGS. 7 and 8 are diagrams illustrating example processes associated with beam indication for multicast wakeup signals, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with beam indication for multicast wakeup signals.

As shown in FIG. 7, in some aspects, process 700 may include transmitting, to a base station, a first message that indicates a preferred beam and a multicast session (block 710). For example, the UE (e.g., using transmit processor 264, TX MIMO processor 266, MOD 254, antenna 252, controller/processor 280, memory 282, and/or transmission component 904) may transmit, to a base station, a first message that indicates a preferred beam and a multicast session, as described above.

As further shown in FIG. 7, in some aspects, process 700 may include receiving, from the base station, a second message that indicates an association between a WUS and the multicast session, and a set of beams for receiving the WUS, the set of beams including the preferred beam (block 720). For example, the UE (e.g., using antenna 252, DEMOD 254, MIMO detector 256, receive processor 258, controller/processor 280, memory 282, and/or reception component 902) may receive, from the base station, a second message that indicates an association between a WUS and the multicast session, and a set of beams for receiving the WUS, the set of beams including the preferred beam, as described above.

As further shown in FIG. 7, in some aspects, process 700 may include receiving, from the base station and based at least in part on the second message, the WUS for the multicast session using a beam from the set of beams (block 730). For example, the UE (e.g., using antenna 252, DEMOD 254, MIMO detector 256, receive processor 258, controller/processor 280, memory 282, and/or reception component 902) may receive, from the base station and based at least in part on the second message, the WUS for the multicast session using a beam from the set of beams, as described above.

Process 700 may include additional aspects, such as any single aspect or any combination of aspects described below and/or in connection with one or more other processes described elsewhere herein.

In a first aspect, process 700 includes receiving (e.g., using antenna 252, DEMOD 254, MIMO detector 256, receive processor 258, controller/processor 280, memory 282, and/or reception component 902) a reference signal in a plurality of candidate beams, and selecting (e.g., using controller/processor 280, memory 282, and/or beam selection component 908) the preferred beam from the plurality of candidate beams.

In a second aspect, alone or in combination with the first aspect, the first message further indicates a channel quality associated with the preferred beam.

In a third aspect, alone or in combination with one or more of the first and second aspects, the first message is transmitted in at least one of RRC signaling, a MAC-CE, uplink control information, or a PRACH preamble message.

In a fourth aspect, alone or in combination with one or more of the first through third aspects, the second message indicates that the WUS is associated with the multicast session and another multicast session associated with a same DRX cycle length as the multicast session.

In a fifth aspect, alone or in combination with one or more of the first through fourth aspects, the set of beams includes preferred beams of multiple UEs that transmitted a message indicating at least one of the multicast session or another multicast session associated with a same DRX cycle length as the multicast session.

In a sixth aspect, alone or in combination with one or more of the first through fifth aspects, the set of beams includes preferred beams of multiple UEs that transmitted a message indicating the multicast session.

In a seventh aspect, alone or in combination with one or more of the first through sixth aspects, the second message is a broadcast message or a unicast message.

In an eighth aspect, alone or in combination with one or more of the first through seventh aspects, the WUS indicates whether the UE is to monitor a PDCCH during a DRX on-duration for the multicast session.

In a ninth aspect, alone or in combination with one or more of the first through eighth aspects, process 700 includes selectively performing (e.g., using antenna 252, DEMOD 254, MIMO detector 256, receive processor 258, controller/processor 280, memory 282, and/or reception component 902) a wakeup operation based at least in part on the WUS.

In a tenth aspect, alone or in combination with one or more of the first through ninth aspects, the UE is a reduced capability UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
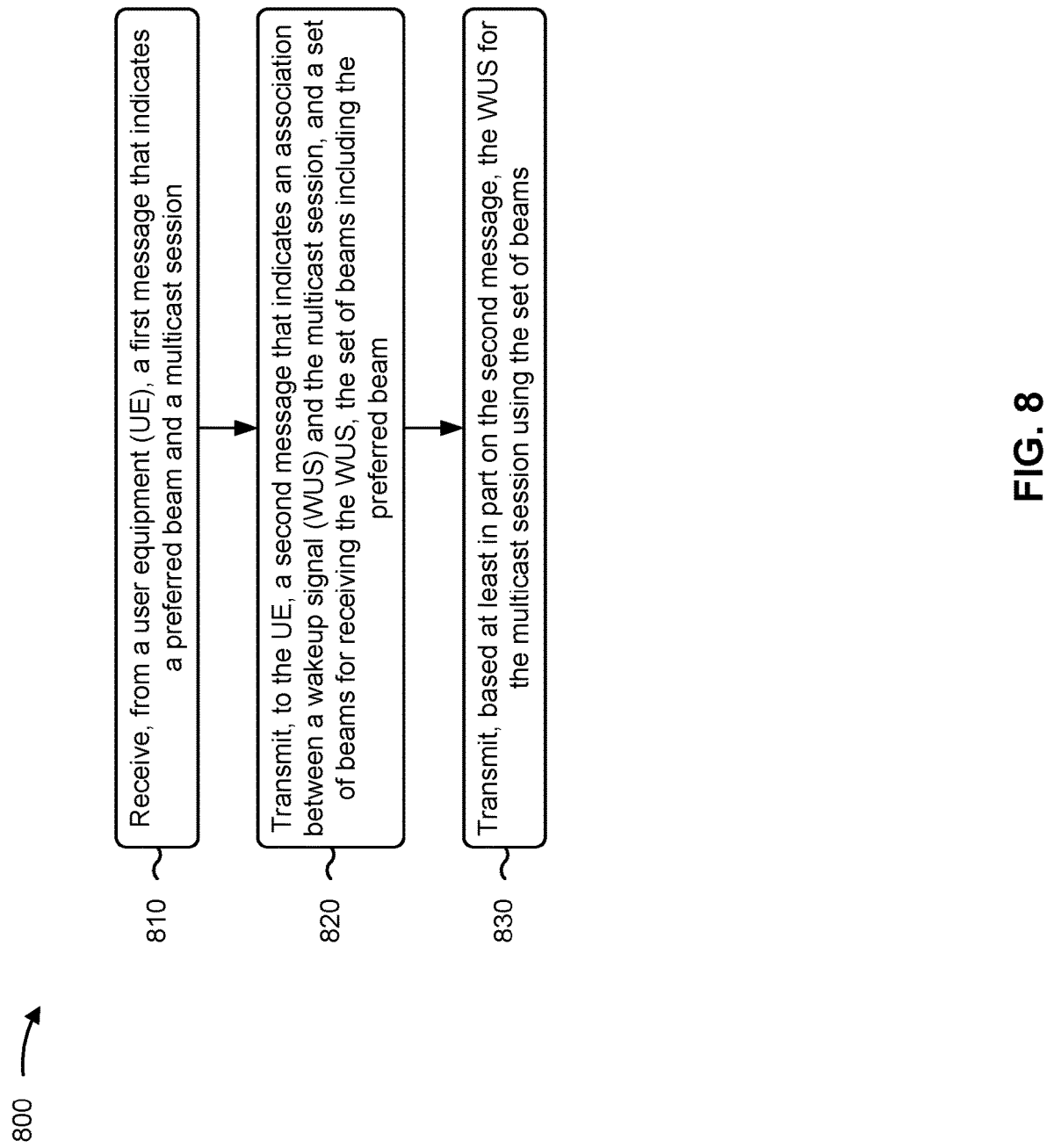

FIG. 8 is a diagram illustrating an example process 800 performed, for example, by a base station, in accordance with various aspects of the present disclosure. Example process 800 is an example where the base station (e.g., base station 110) performs operations associated with beam indication for multicast wakeup signals.

As shown in FIG. 8, in some aspects, process 800 may include receiving, from a UE, a first message that indicates a preferred beam and a multicast session (block 810). For example, the base station (e.g., using antenna 234, DEMOD 232, MIMO detector 236, receive processor 238, controller/processor 240, memory 242, scheduler 246, and/or reception component 1002) may receive, from a UE, a first message that indicates a preferred beam and a multicast session, as described above.

As further shown in FIG. 8, in some aspects, process 800 may include transmitting, to the UE, a second message that indicates an association between a WUS and the multicast session, and a set of beams for receiving the WUS, the set of beams including the preferred beam (block 820). For example, the base station (e.g., using transmit processor 220, TX MIMO processor 230, modulator 232, antenna 234, controller/processor 240, memory 242, scheduler 246, and/or transmission component 1004) may transmit, to the UE, a second message that indicates an association between a WUS and the multicast session, and a set of beams for receiving the WUS, the set of beams including the preferred beam, as described above.

As further shown in FIG. 8, in some aspects, process 800 may include transmitting, based at least in part on the second message, the WUS for the multicast session using the set of beams (block 830). For example, the base station (e.g., using transmit processor 220, TX MIMO processor 230, modulator 232, antenna 234, controller/processor 240, memory 242, scheduler 246, and/or transmission component 1004) may transmit, based at least in part on the second message, the WUS for the multicast session using the set of beams, as described above.

Process 800 may include additional aspects, such as any single aspect or any combination of aspects described below and/or in connection with one or more other processes described elsewhere herein.

In a first aspect, process 800 includes transmitting (e.g., using transmit processor 220, TX MIMO processor 230, modulator 232, antenna 234, controller/processor 240, memory 242, scheduler 246, and/or transmission component 1004) a reference signal in a plurality of candidate beams, and the preferred beam is one of the plurality of candidate beams.

In a second aspect, alone or in combination with the first aspect, process 800 includes determining (e.g., using controller/processor 240, memory 242, and/or determination component 1008) the association between the WUS and the multicast session based at least in part on the first message.

In a third aspect, alone or in combination with one or more of the first and second aspects, the first message further indicates a channel quality associated with the preferred beam.

In a fourth aspect, alone or in combination with one or more of the first through third aspects, the first message is received in at least one of RRC signaling, a MAC-CE, uplink control information, or a PRACH preamble message.

In a fifth aspect, alone or in combination with one or more of the first through fourth aspects, the second message indicates that the WUS is associated with the multicast session and another multicast session associated with a same DRX cycle length as the multicast session.

In a sixth aspect, alone or in combination with one or more of the first through fifth aspects, the set of beams includes preferred beams of multiple UEs that transmitted a message indicating at least one of the multicast session or another multicast session associated with a same DRX cycle length as the multicast session.

In a seventh aspect, alone or in combination with one or more of the first through sixth aspects, the set of beams includes preferred beams of multiple UEs that transmitted a message indicating the multicast session.

In an eighth aspect, alone or in combination with one or more of the first through seventh aspects, the second message is a broadcast message or a unicast message.

In a ninth aspect, alone or in combination with one or more of the first through eighth aspects, the WUS indicates whether the UE is to monitor a PDCCH during a DRX on-duration for the multicast session.

In a tenth aspect, alone or in combination with one or more of the first through ninth aspects, the UE is a reduced capability UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
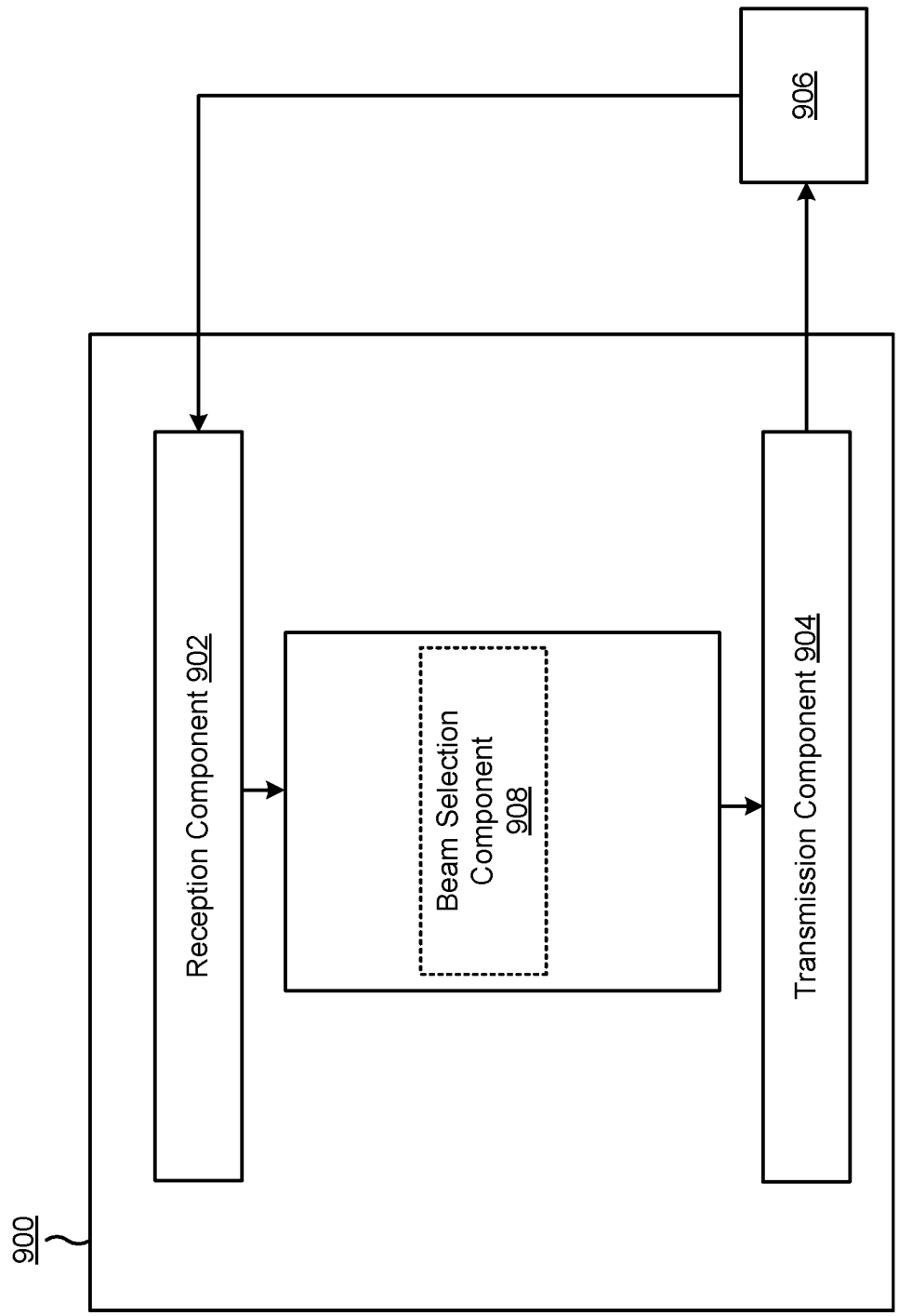
FIGS. 9 and 10 are block diagrams of example apparatuses for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a beam selection component 908, among other examples.

In some aspects, the apparatus 900 may be configured to perform one or more operations described herein in connection with FIGS. 5, 6A, and 6B. Additionally or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The transmission component 904 may transmit, to a base station, a first message that indicates a preferred beam and a multicast session. The reception component 902 may receive, from the base station, a second message that indicates an association between a WUS and the multicast session, and a set of beams for receiving the WUS, the set of beams including the preferred beam. The reception component 902 may receive, from the base station and based at least in part on the second message, the WUS for the multicast session using a beam from the set of beams. The reception component 902 may selectively perform a wakeup operation based at least in part on the WUS.

The reception component 902 may receive a reference signal in a plurality of candidate beams. The beam selection component 908 may select the preferred beam from the plurality of candidate beams. For example, the beam selection component 908 may perform measurements of the reference signal in the plurality of candidate beams and may determine the preferred beam based at least in part on the measurements, as described above. In some aspects, the beam selection component 908 may include one or more antennas, a demodulator, a MIMO detector, a receive processor, a controller/processor, a memory, or a combination thereof, of the UE described above in connection with FIG. 2.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
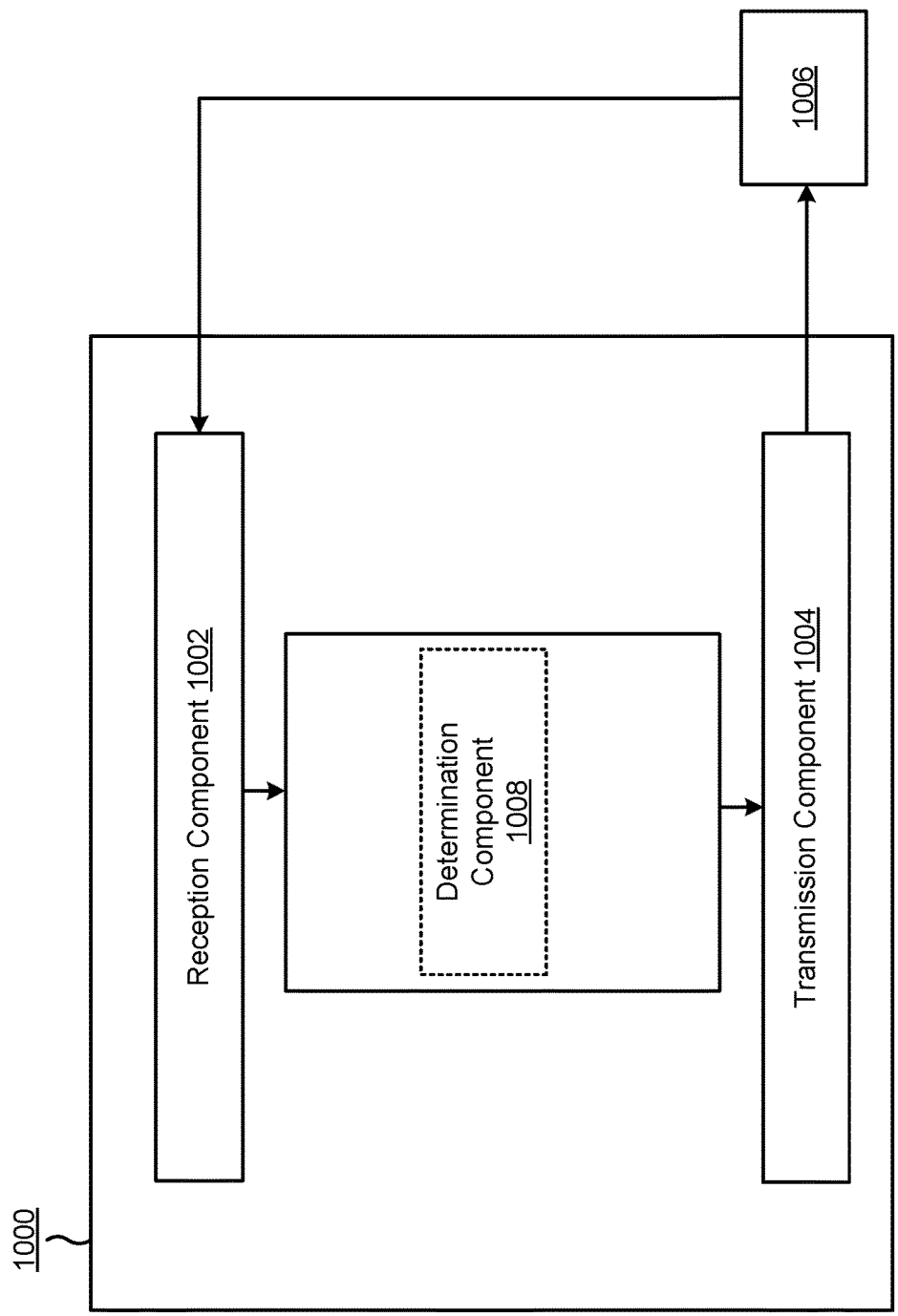

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5, 6A, and 6B. Additionally or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

The reception component 1002 may receive, from a UE, a first message that indicates a preferred beam and a multicast session. The transmission component 1004 may transmit a reference signal in a plurality of candidate beams, and the preferred beam may be one of the plurality of candidate beams. The transmission component 1004 may transmit, to the UE, a second message that indicates an association between a WUS and the multicast session, and a set of beams for receiving the WUS, the set of beams including the preferred beam. The transmission component 1004 may transmit, based at least in part on the second message, the WUS for the multicast session using the set of beams.

The determination component 1008 may determine the association between the WUS and the multicast session based at least in part on the first message (e.g., based at least in part on reports received from multiple UEs), as described above. The determination component 1008 may determine the set of beams for the WUS (e.g., based at least in part on reports received from multiple UEs), as described above. In some aspects, the determination component 1008 may include a controller/processor, a memory, or a combination thereof, of the base station described above in connection with FIG. 2.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a base station, a first message that indicates a preferred beam and a multicast session;
   receiving, from the base station, a second message that indicates an association between a wakeup signal (WUS) and the multicast session, and a set of beams for receiving the WUS, the set of beams including the preferred beam; and
   receiving, from the base station and based at least in part on the second message, the WUS for the multicast session using a beam from the set of beams.

2. The method of claim 1, further comprising:
   receiving a reference signal in a plurality of candidate beams; and
   selecting the preferred beam from the plurality of candidate beams.

3. The method of claim 1, wherein the first message further indicates a channel quality associated with the preferred beam.

4. The method of claim 1, wherein the first message is transmitted in at least one of radio resource control signaling, a medium access control control element, uplink control information, or a physical random access channel preamble message.

5. The method of claim 1, wherein the second message indicates that the WUS is associated with the multicast session and another multicast session associated with a same discontinuous reception cycle length as the multicast session.

6. The method of claim 1, wherein the set of beams includes preferred beams of multiple UEs that transmitted a message indicating at least one of the multicast session or another multicast session associated with a same discontinuous reception cycle length as the multicast session.

7. The method of claim 1, wherein the set of beams includes preferred beams of multiple UEs that transmitted a message indicating the multicast session.

8. The method of claim 1, wherein the second message is a broadcast message or a unicast message.

9. The method of claim 1, wherein the WUS indicates whether the UE is to monitor a physical downlink control channel during a discontinuous reception on-duration for the multicast session.

10. The method of claim 1, further comprising:
    selectively performing a wakeup operation based at least in part on the WUS.

11. The method of claim 1, wherein the UE is a reduced capability UE.

12. A method of wireless communication performed by a base station, comprising:
    receiving, from a user equipment (UE), a first message that indicates a preferred beam and a multicast session;
    transmitting, to the UE, a second message that indicates an association between a wakeup signal (WUS) and the multicast session, and a set of beams for receiving the WUS, the set of beams including the preferred beam; and
    transmitting, based at least in part on the second message, the WUS for the multicast session using the set of beams.

13. The method of claim 12, further comprising:
    transmitting a reference signal in a plurality of candidate beams,
    wherein the preferred beam is one of the plurality of candidate beams.

14. The method of claim 12, further comprising:
    determining the association between the WUS and the multicast session based at least in part on the first message.

15. The method of claim 12, wherein the first message further indicates a channel quality associated with the preferred beam.

16. The method of claim 12, wherein the first message is received in at least one of radio resource control signaling, a medium access control control element, uplink control information, or a physical random access channel preamble message.

17. The method of claim 12, wherein the second message indicates that the WUS is associated with the multicast session and another multicast session associated with a same discontinuous reception cycle length as the multicast session.

18. The method of claim 12, wherein the set of beams includes preferred beams of multiple UEs that transmitted a message indicating at least one of the multicast session or another multicast session associated with a same discontinuous reception cycle length as the multicast session.

19. The method of claim 12, wherein the set of beams includes preferred beams of multiple UEs that transmitted a message indicating the multicast session.

20. The method of claim 12, wherein the second message is a broadcast message or a unicast message.

21. The method of claim 12, wherein the WUS indicates whether the UE is to monitor a physical downlink control channel during a discontinuous reception on-duration for the multicast session.

22. The method of claim 12, wherein the UE is a reduced capability UE.

23. A user equipment (UE) for wireless communication, comprising:
    a memory; and
    one or more processors operatively coupled to the memory, the one or more processors configured to:
    transmit, to a base station, a first message that indicates a preferred beam and a multicast session;
    receive, from the base station, a second message that indicates an association between a wakeup signal (WUS) and the multicast session, and a set of beams for receiving the WUS, the set of beams including the preferred beam; and
    receive, from the base station and based at least in part on the second message, the WUS for the multicast session using a beam from the set of beams.

24. The UE of claim 23, wherein the second message indicates that the WUS is associated with the multicast session and another multicast session associated with a same discontinuous reception cycle length as the multicast session.

25. The UE of claim 23, wherein the set of beams includes preferred beams of multiple UEs that transmitted a message indicating at least one of the multicast session or another multicast session associated with a same discontinuous reception cycle length as the multicast session.

26. The UE of claim 23, wherein the second message is a broadcast message or a unicast message.

27. A base station for wireless communication, comprising:
  a memory; and
  one or more processors operatively coupled to the memory, the one or more processors configured to:
    receive, from a user equipment (UE), a first message that indicates a preferred beam and a multicast session;
    transmit, to the UE, a second message that indicates an association between a wakeup signal (WUS) and the multicast session, and a set of beams for receiving the WUS, the set of beams including the preferred beam; and
    transmit, based at least in part on the second message, the WUS for the multicast session using the set of beams.

28. The base station of claim 27, wherein the second message indicates that the WUS is associated with the multicast session and another multicast session associated with a same discontinuous reception cycle length as the multicast session.

29. The base station of claim 27, wherein the set of beams includes preferred beams of multiple UEs that transmitted a message indicating at least one of the multicast session or another multicast session associated with a same discontinuous reception cycle length as the multicast session.

30. The base station of claim 27, wherein the second message is a broadcast message or a unicast message.

* * * * *